Aug. 21, 1945.　　　　R. S. SINK　　　　2,383,348
GEOMETRICAL INSTRUMENT
Filed Sept. 24, 1942
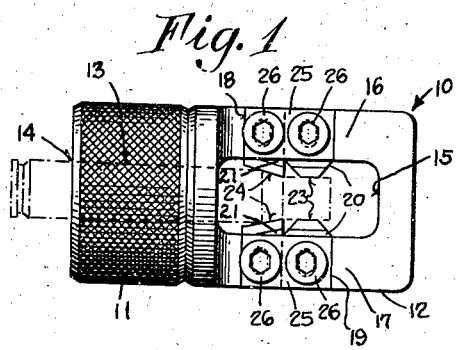
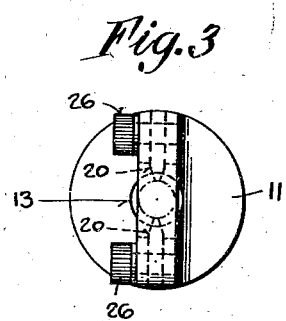
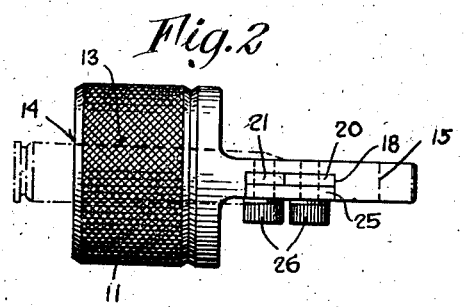
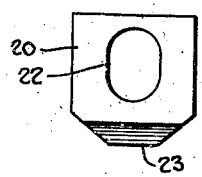
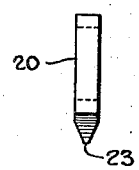
INVENTOR
Russell S. Sink
BY
Harold L. Gammons
AGENT Patented Aug. 21, 1945

2,383,348

UNITED STATES PATENT OFFICE 2,383,348

GEOMETRICAL INSTRUMENT

Russell S. Sink, Denver, Colo., assignor to Remington Arms Company, Inc., Bridgeport, Conn., a corporation of Delaware Application September 24, 1942, Serial No. 459,483

4 Claims. (Cl. 33—174)

This invention relates, in general, to gauges, and, in particular, to an adjustable limit gauge for simultaneously gauging a plurality of surfaces.

An object of the invention is to provide a gauge for supporting an article to be gauged, so that by holding the gauge to the light, the operator may readily determine the accuracy of the article.

A further object is to provide a gauge for simultaneously checking two different dimensions of an article supported therein.

A still further object is to provide a gauge with means whereby the gauging elements may be adjusted independently of each other to a wide range of sizes and kinds of work.

Other objects, features and advantages of the invention will be more particularly described in the specification below.

In the drawing:

Fig. 1 is a side elevation of the gauge of this invention.

Fig. 2 is a plan view of the gauge.

Fig. 3 is an end view of the gauge.

Fig. 4 is a front elevation of one of the gauge blades.

Fig. 5 is an end elevation of the blade shown in Fig. 4.

In the following specification is described one embodiment of the invention which is particularly adapted to gauge the neck and shoulder portions of a cartridge case, but it will be understood that this embodiment is for the purposes of illustration only, and that modifications thereof may be made without departing from the scope of the invention as defined in the appended claims.

Referring to Fig. 1, the limit gauge of this invention is shown generally at 10 and comprises a cylindrical article supporting means 11 and a substantially rectangular apertured frame 12, the latter being formed as an integral part of the cylinder 11 with its longitudinal axis extending substantially perpendicularly from one face or end of the cylinder and in axial alignment with the longitudinal axis thereof.

The cylindrical article supporting means 11 is provided with an axially drilled hole 13 of a diameter suitable to accommodate the article to be gauged. In the present embodiment, the drilled hole is of a size and shape to receive a .30 caliber cartridge case, and hence, is slightly tapered and substantially forty-six hundredths inches in diameter at its outer end 14. It will be understood, however, that the shape and dimensions of the hole may vary in accordance with the type of article to be gauged.

The substantially rectangular frame 12 comprises an aperture 15 which forms an extension of the aperture 13 of the cylindrical article supporting means 11; and two spaced parallel upper and lower arms or sides 16 and 17. The sides 16 and 17 comprise means for supporting the article gauging means hereinafter described in adjusted position within the aperture 15 of the frame, and, to this end, each arm or side member 16 and 17 is provided with a substantially rectangular recess 18 and 19 respectively milled or otherwise cut in one face thereof in the manner shown in Figs. 1 and 2.

The article gauging means comprise two dissimilar pairs of blades 20 and 21 respectively, each blade being a thin substantially rectangular plate adapted to make a light driving fit in the respective recesses 18 and 19 of the arms and having an elongated aperture 22 in the body portion thereof and a bevelled lower edge as shown in Figs. 1, 4 and 5. The bevelled edges 23 of the two matching gauge blades 20 are substantially straight, that is to say, these edges are constructed and arranged to be substantially parallel to the longitudinal axis of the frame when mounted therein whereas the bevelled edges 24 of the two matching gauge blades 21 (see Fig. 1) are at an angle to the longitudinal axis of the frame, which, in this instance, is commensurate with the slope of the shoulder of a standard .30 caliber cartridge case. It will be understood, however, that the bevelled edges of both pairs of gauge blades may have shapes other than those shown and may be rearranged in the frame depending upon the shape and arrangement of the surfaces to be gauged. In the gauge shown, one pair of dissimilar blades 20 and 21 are adapted to be positioned successively or side by side in each arm of the frame with the matching blades 21 to the left of the matching blades 20 as seen in Fig. 1.

Suitable means for adjustably securing the blades in the recesses of the frame with their bevelled edges or gauging surfaces projecting inwardly into the aperture 15 of the frame, in the manner shown in Fig. 1, comprise substantially rectangular apertured face plates 25 (see Fig. 2) adapted to fit over each respective pair of dissimilar gauge blades in the recesses 18 and 19; and the cap screws 26. The latter project through the face plates 25 and the elongated apertures 22 of the gauge blades, and are threadedly secured in suitable holes in the frame.

It will be clear that by loosening the cap screws 26 each gauge blade may be adjusted in the frame independently of the others. Although the gauge means shown and described are in the form of slidingly adjustable blades, it will be understood that equivalent means such as posts having suitable gauging surfaces at the ends thereof may be adjustably secured in the frame.

When using the gauge tool, the inspector inserts the article to be gauged, in this instance, a .30 caliber cartridge case, into the cylindrical part 11 until the case has been advanced to its foremost position which is determined by the taper of the hole 13. The neck and shoulder portions of the case will then be opposite the two pair of gauging blades 21 and 20 respectively, the bevelled edges of which have been previously adjusted to engage the corresponding portions of a standard case. Then, by holding the gauge tool to the light, the inspector can simultaneously detect any inaccuracies in the finished size and shape of both the neck and shoulder portions of the case by noting any cracks of light which may appear between these surfaces and the gauging blades. The case being supported in aperture 13, the gauge blades will likewise detect any eccentricity of the neck portion of the case even though the neck be of correct size.

What is claimed is:

1. In a limit gauge, the combination with a frame having an aperture; of means adjacent one end of said frame for supporting an article to be gauged in said frame aperture, said supporting means having an aperture shaped like a portion of said article to limit the portion of the article which extends into said frame aperture; a pair of gauging elements positioned in said frame on one side of said frame aperture; and a second pair of gauging elements matching said first pair and positioned in said frame on the opposite side of said frame aperture, said first and second pairs of gauging elements being adapted to simultaneously gauge two dissimilar surfaces of said article.

2. In a limit gauge, the combination with a substantially rectangular frame having an aperture; of a cylindrical element joined integrally to one end of said frame, said cylindrical element having an axially drilled hole in alignment with the aperture of said frame for supporting an article to be gauged in said frame aperture; and gauging elements successively positioned in said frame comprising matching blades adapted to project into said frame aperture on opposite sides of an article positioned therein.

3. In a limit gauge for cartridge cases, the combination with a substantially rectangular frame having an aperture; of a cylindrical element joined integrally to one end of said frame, said cylindrical element having an axially drilled hole in alignment with the aperture of said frame for supporting a cartridge case to be gauged in said frame aperture; and gauging elements successively positioned in said frame on opposite sides of said aperture comprising pairs of matching blades, one pair of blades being set in front of the second pair of blades and having inclined gauging surfaces, said first and second pairs of blades being adapted to simultaneously gauge a conical surface and a cylindrical surface respectively of said case.

4. In a gauge for cartridge cases, the combination with a substantially rectangular frame having an aperture; of a cylindrical element joined integrally to one end of said frame, said cylindrical element having an axial hole in alignment with the aperture of said frame for supporting a cartridge case to be gauged, the neck portion thereof being positioned in said frame aperture; gauging elements; and means for adjustably securing said gauging elements in said frame on opposite sides of said aperture for detecting the eccentricity of said neck portion with respect to the body portion of said case.

RUSSELL S. SINK.